United States Patent [19]

Lewis

[11] Patent Number: 5,040,831
[45] Date of Patent: Aug. 20, 1991

[54] NON THREADED PIPE CONNECTOR SYSTEM

[76] Inventor: Phil Lewis, 3614 Tangley, Houston, Tex. 77005

[21] Appl. No.: 464,365

[22] Filed: Jan. 12, 1990

[51] Int. Cl.$^5$ ............................................. F16L 37/08
[52] U.S. Cl. .................................... 285/305; 285/382; 285/403
[58] Field of Search ...................... 285/305, 382, 382.7, 285/403; 403/282, 279; 29/525.1, 515

[56] References Cited

U.S. PATENT DOCUMENTS

| | | |
|---|---|---|
| 2,021,241 | 11/1935 | Hall . |
| 3,698,747 | 10/1972 | Wing et al. . |
| 3,973,791 | 8/1976 | Porta et al. . |
| 4,127,354 | 11/1978 | Mixon, Jr. ............................ 403/279 |
| 4,433,861 | 2/1984 | Krecjik . |
| 4,519,638 | 5/1985 | Yodoshi et al. ................. 285/382 X |
| 4,723,796 | 2/1988 | Nattel . |
| 4,811,975 | 3/1989 | Paul, Jr. et al. . |
| 4,813,716 | 3/1989 | Lalikos et al. . |

FOREIGN PATENT DOCUMENTS

| | | | |
|---|---|---|---|
| 683947 | 3/1965 | Italy | ..................................... 285/305 |
| 298888 | 6/1987 | Japan . | |
| 902447 | 8/1962 | United Kingdom . | |

Primary Examiner—Andrew V. Kundrat
Assistant Examiner—Heather Chun
Attorney, Agent, or Firm—Parks & Associates

[57] ABSTRACT

A non threaded pipe connecting system for connecting pipe without the use of threads comprising; a first pipe member; a second pipe connector member having at least two slots formed therein and an inside diameter larger than the outside diameter of the first pipe member for receiving and snugly fitting about the outside diameter of the first pipe member; at least one o-ring mounted between the first and second pipe members for forming a seal therebetween and; a U-shaped clip member having generally parallel legs for being driven along the slots of the second pipe connector member on the outside of the second pipe member for sharply deforming the surface of the first pipe member on at least two sides and for forming an angle with said first pipe member along the sharply deformed area on the first pipe member for preventing the first pipe member from moving after insertion into the second pipe connector member.

14 Claims, 3 Drawing Sheets

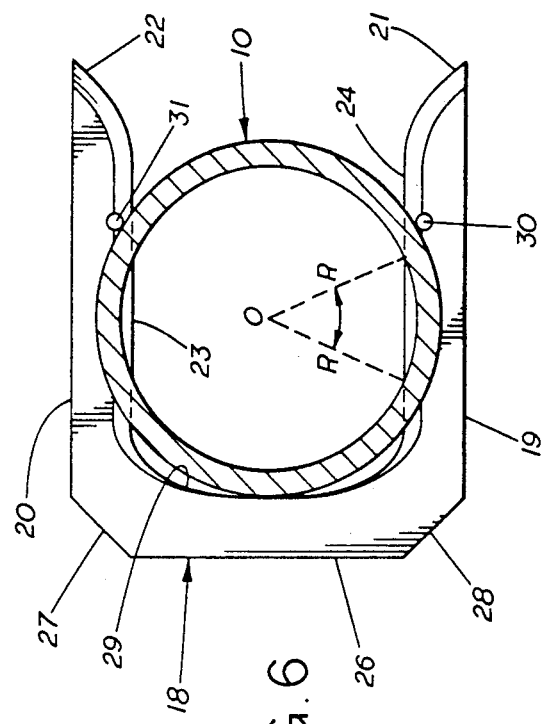
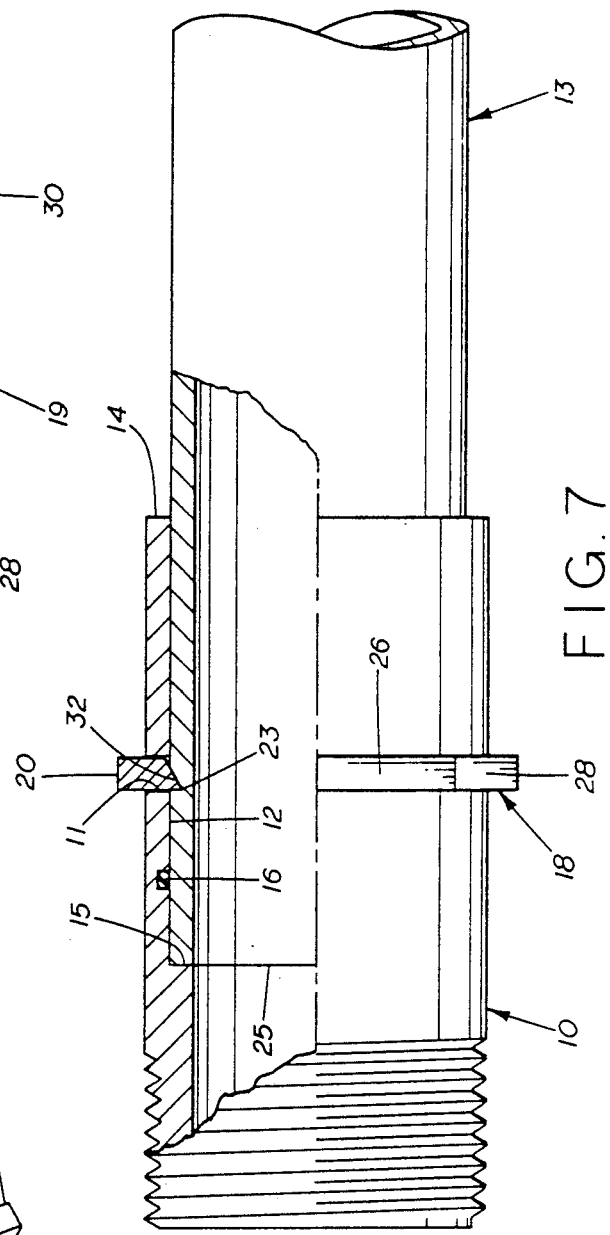
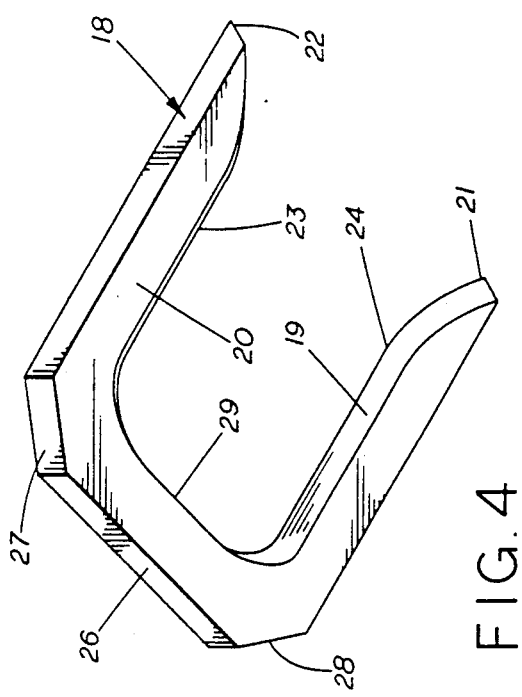

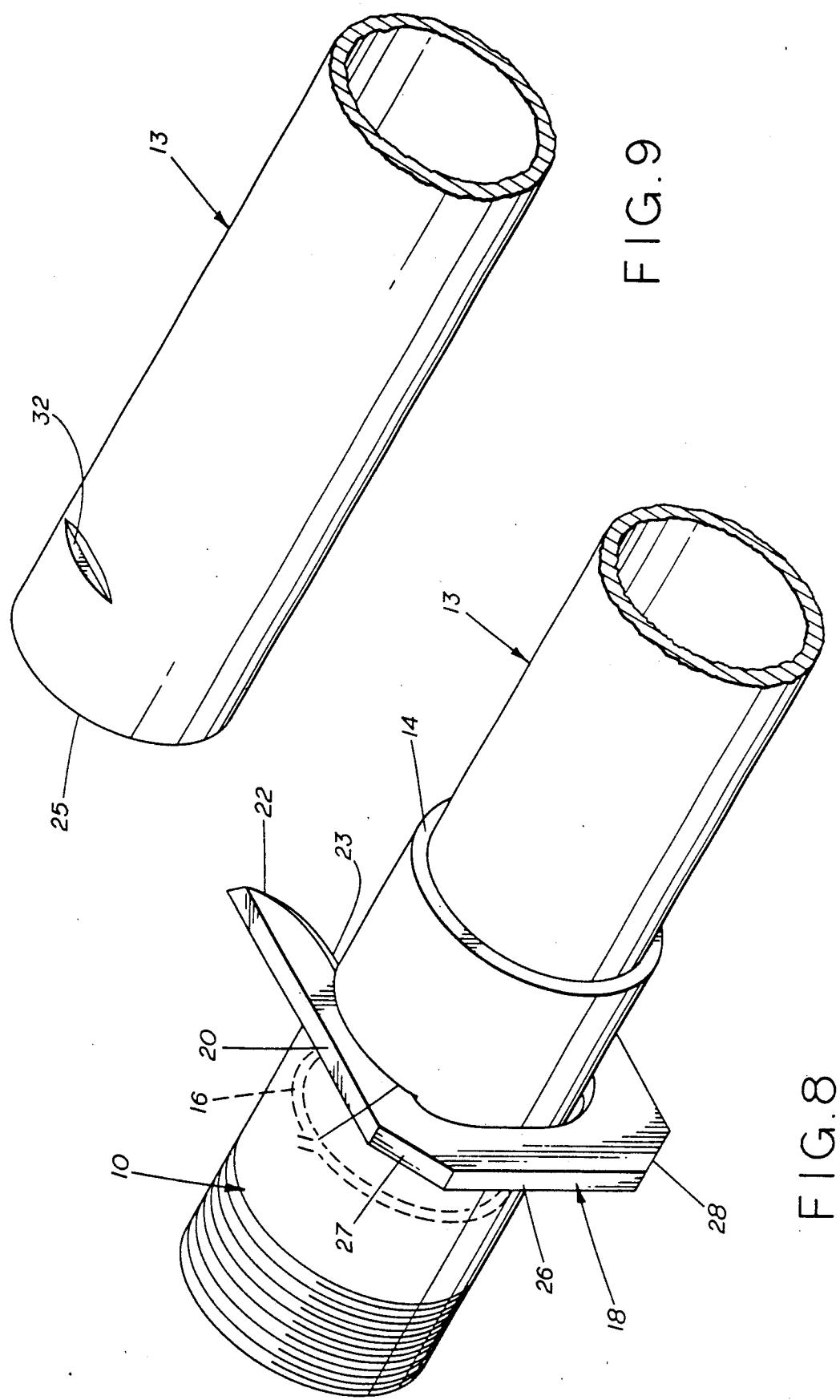

NON THREADED PIPE CONNECTOR SYSTEM

BACKGROUND OF THE INVENTION

This invention relates to a system for connecting two pipe ends by inserting one pipe into a second pipe connector member. These pipes are made from any material which is capable of being deformed or creased by the U-shaped clip members being driven across their surface.

This invention further relates to a non-threaded pipe connector system for connecting pipe without having to utilize threads and for providing a seal which is substantially as tight a seal as is found in a threaded type connection.

Also, this invention relates to a non threaded pipe connector which can also serve as a quick release and reconnect fitting having broad applications.

While there have been many prior patents which have utilized varying shapes of U-shaped members whether they were round or flat, nevertheless, these prior U-shaped members required that the pipe to be joined have a channeled surface or a groove pre-cut therein such that once inserted the U-shaped clip must be fitted through or about the groove of the joining member to engage the groove or fit into a predetermined hole on the second pipe, for forming a union or locking mechanism to prevent the inserted pipe from backing out once the piping system was pressurized.

One example is described in British Pat. No. 902,447, which provides a U-shaped clip which is passed through a slotted member to engage a peripheral groove on the pipe which is inserted into a sleeve. The U-shaped retainer piece is inserted through the slotted member on the sleeve for engagement with the peripheral groove on the pipe.

Also prior art patents such as U.S. Pat. No. 4,433,861 provide for a means of deforming a metal pipe to form a tight connection. However, in this patent, the receiving pipe member was provided with a groove which was defined internally of the receiving pipe member for receiving the tension hoop leg. This internally defined groove provided the means for driving the tension hoop leg to grip in this connector. This connector is very expensive to manufacture. This internal groove is used to drive the legs of the hoop against the pipe to be held and prevents the spreading forces generated, when the pipes are pressured up, from causing the hoop to open and to fail as a connector. The requirement for such an internal groove is a continuation of the expensive and complex means of attempting to join pipe using exotic and complicated mechanisms.

Also, pipe connectors of the prior art which had grooves machined in the pipe, required the pipe to be much thicker walled pipe This added thickness is because pipe is rated based on its thinest wall thickness and providing a notch required additional wall thickness after it was machined to keep the pipe properly rated, clearly making such pipe more expensive.

Prior art pipe connector required specialized equipment in the field for its installation or the pipe and connector had to have very exacting tolerance for the system to be fitted together and the clip and grooves to be matched up in the field installations.

Also, the hoops of this U.S. Pat. No. 4,433,861 that the slotting members be offset from each other less they engage and interfere with the locking procedure. This requires a significant amount of additional machining and a significant amount of accuracy in the production of such pipe connecting assemblies and makes them relatively expensive.

SUMMARY OF THE INVENTION

The prior art has produced many quick release systems for rapid connect and disconnect utilizing various forms of clips and/or clamping devices. However, in nearly all cases, these clipping members are passed through a slot and designed to engage a pre-machined groove found in the member to be connected which requires a great deal of precision machining in order to have the holes aligned with the clipping mechanism.

Also, because the field assembly environments are less than idea, the tolerance for error and non-matching of the pre-machined parts is very great and creates great problems in the use of such connector in the field.

Another object of this invention is to provide an improved coupling member which can be used for forming a seal and which does not require any expensive machined parts in order to form the connection.

A further object of this invention is to provide a connection which can be readily taken apart and recut with inexpensive equipment in the field and then re-joined where ever needed.

Yet a further object of this invention is to provide a connector system which can be made with relatively thin walled pipe and the connector system does not require that the pipe be thicker for the purpose of keeping its rating when this connector system is used and it does not require a machined groove be cut in the pipe to form a connection.

It is a further object of this invention to provide a leading edge on the U-shaped clip which provides means that sharply deform the surface of the first pipe member and form an angle therewith to prevent spreading forces when the piping system is pressured up, from causing the parallel legs of the U-shaped clip from spreading and failing to hold the first pipe member.

It is further object to provide deformation with the U-shaped clip member when passed along the outside of the slots formed in the second pipe connector member to a depth defined by the cord length of the slots expressed as $\frac{1}{4}$ to $\frac{1}{8}$ of the outside diameter of the pipe.

Other object can become more apparent from the following description wherein references may be had to the accompanying sheet of drawings.

BRIEF DESCRIPTION OF THE DRAWINGS

An embodiment of this invention can be seen in the drawings wherein;

FIG. 4 is a prospective view of the U-shaped clip with the cutting edge and deforming edges revealed in prospective.

FIG. 6 is a cross sectional view of the second pipe connector member with the U-shaped clip in place but without a first pipe member being inserted into the second pipe connector member and has super imposed thereon the cord length radius, and angle for calculating an effective cord length;

FIG. 7 is a side view of the completed assembly of first pipe member, second pipe connector member, o-ring and U-shaped clip member;

FIG. 8 is a prospective view of the complete assembly of the U-shaped clip, o-ring and first pipe member fully connected;

FIG. 9 is the first pipe member removed from the second pipe connector member after having been inserted and fastened and then removed, showing the deformed surface caused by the U-shaped clip member as it was driven in place across the first pipe member.

DESCRIPTION OF THE PREFERRED EMBODIMENTS

Figure 1:
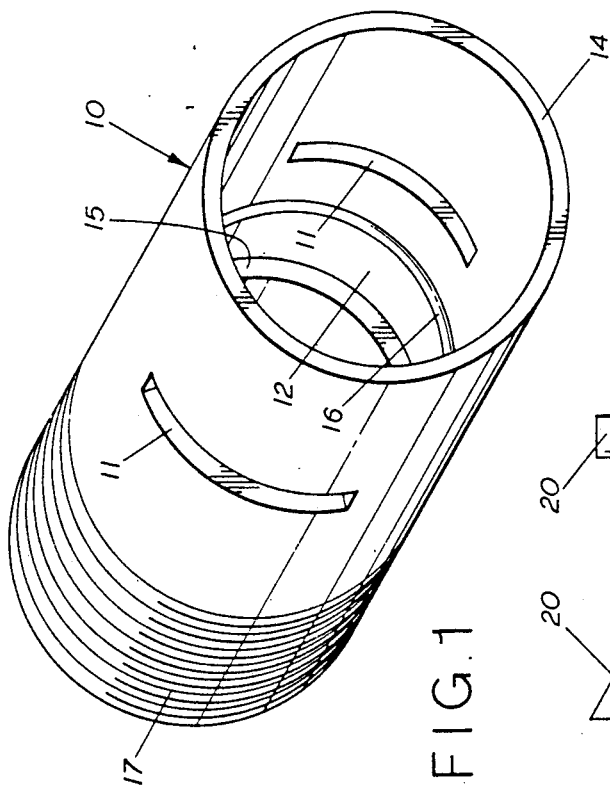
FIG. 1 is a prospective view of the second pipe connector member.

Referring now to FIG. 1, the general reference 10, shows the second pipe connector member 10. In this embodiment in FIG. 1 of second pipe connector member 10, it can be seen that at least two slots 11 are formed in the wall of second pipe connector member 10. These slots may be fashioned in any manner, but in most preferred embodiments, they will be formed by simply making cuts through the wall of the second pipe connector member 10, in such a manner as to make the slots substantially parallel to each other. These slots 11 should be cut to a depth to form a range of cord lengths across the cross-section of the pipe which should range from ¼ to ½ of the outside diameter of the second pipe connector member 10 using the equation of cord length = 2 radius (of the second pipe connector member 10) (sin) ½ angle (created by radius forming the cord) and as diametrically set out in FIG. 6.

It should be realized that the cord length is very important because too great of cord length provides too deep a deformation of the first pipe member 13 and would have a detrimental effect upon the flow within the pipe itself. Further, too short of cord length would not provide sufficient deformation of the first pipe member 13 to hold the first pipe member 13 in place when the piping system is pressurized. Thus, the critical range of a cord length from ¼ to ½ of the outside diameter of the second pipe connector member 10 is important in the application and the practice o this invention.

Figure 5:
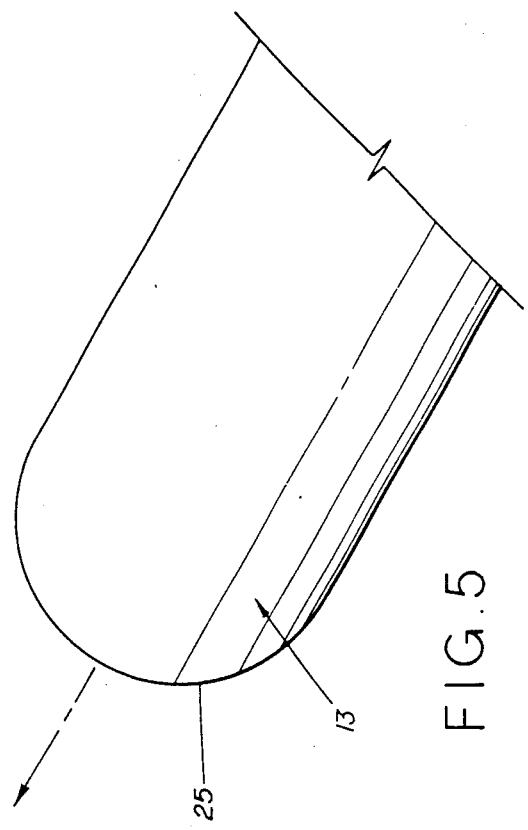
FIG. 5 is a prospective view of a first pipe member with general indication of how it is fitted into FIG. 1.

Also shown in FIG. 1, is a receiving chamber 12 which in one embodiment, at least, is provided for receiving the first pipe member 13 shown in prospective view in FIG. 5, as it would be if it were being moved for insertion into the second pipe connector member 10.

The receiving chamber 12 is defined by the front edge 14 of the second pipe connector member 10 and a stopping seat 15 which is located within the second pipe connector member 10 a sufficient distance for the first pipe member 13 to pass by the slots 11 and for providing sufficient surface of the first pipe member 13 under the slots 11 to allow deformation of the first pipe member 13 and not affect the leading edge 25 of the first pipe member 13. It will be appreciated in viewing the joined first pipe member 13 and second pipe connector member 10 shown in the prospective views of FIGS. 1 and 5 that the first pipe member 13 would slide inside the second pipe connector member 10 into the receiving chamber 12 and proceed into the receiving chamber 12 until such time as it seats against the stopping seat 15. Thus stopping seat 15 defines the penetration of the first pipe member 13 when it is advanced into the second pipe connector member 10 and also provides a seat therefor.

It should be understood that the receiving chamber 12 also may have an o-ring sealing member 16, located within the receiving chamber 12 for forming a seal between the first pipe member 13 and the second pipe connector member 10. As shown in FIG. 1, one end of the second pipe connector member 10 has a standard threaded end for joining to an existing or conventional pipe systems and, thus, the system of this invention may be used with conventional threaded systems. However, it should be understood that both ends of a pipe may use this connector system and not rely on any conventional threaded connection at all.

Figure 2:
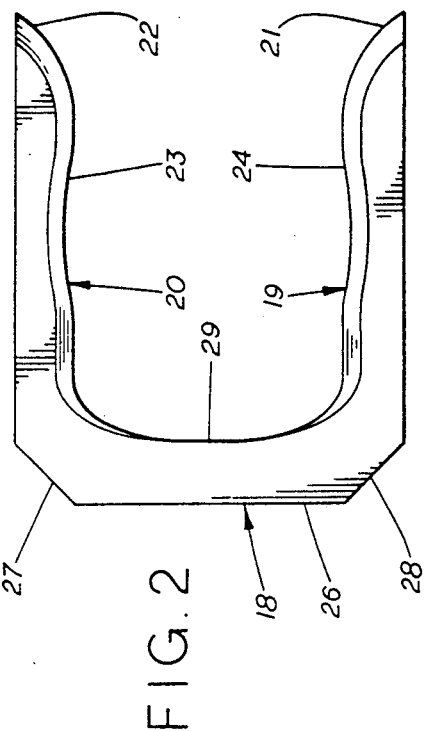
FIG. 2 is a side elevation view of the U-shaped clip member.

Referring now to FIGS. 2, 3 and 6, the U-shaped clip member 13 as shown has a unique design in that the leading edges 21 and 22 of parallel legs 19 and 20 are formed in such a way as to form a gradual cutting surface which continually increases the depth of cut on the first pipe member 13 as the U-shaped clip 18 is driven along the slots 11 of the second pipe connector member 10 and over the surface of first pipe member 13. This driving of U-shaped clip member 18 can be accomplished by any conventional means such as a hand held hammer and, thus, require no special tools for its installation.

As the U-shaped clip member 13 is driven further along the slots 11, the leading edges 21 and 22 gradually are formed into a deforming edge; 23 and 24 for deforming the outer diameter of the first pipe member 13 as the U-shaped clip member 13 is driven along the slots 11 of the second pipe connector member 10.

Referring to FIG. 6 which shows a cross section of the second pipe connector member 10, with the U-shaped clip member 18 inserted in the slots 11 but without the first pipe member 13 in place, it can be seen that the parallel surface of the generally parallel legs 19 and 20 would pass along the outside edges of the second pipe connector member 10 and that only a portion of the U-shaped clip member 18 protrudes through the slots 11. Thus, it can be seen that as the substantially parallel legs 19 and 20 are driven along the slots 11 they pass on the outside of said second pipe connector member 10.

Figures 3A, 3B:
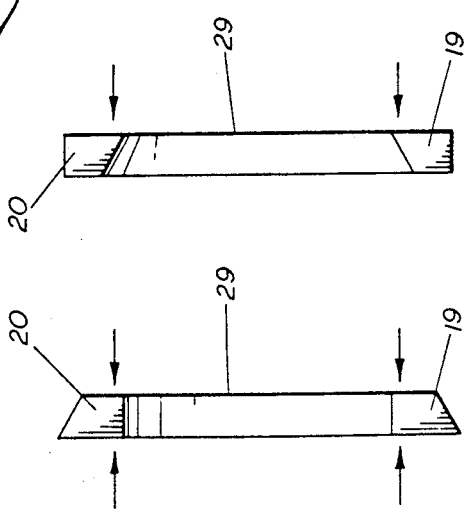
FIG. 3 is an end on view of two different embodiments A and B of the cutting edge and deforming edge of the U-shaped clip member.

It should be understood that while the slots 11 serve as guides, the slots 11 also serve in conjunction with the leading edges 21 and 22 and deforming edges 23 and 24 of the U-shaped clip 18 to form substantially right angles to the surface of the first pipe member 13 for preventing the first pipe member 13 from moving. The formation of the right angle must be with the first pipe member 13 in a direction counter to the direction the pipe member 13 would be driven upon pressuring the piping system. Referring to FIG. 3a, deforming edges 23 and 24 are formed which are substantially at right angles to the first pipe member 13 whether the U-shaped clip means 18 is put in from either direction. However, FIG. 3b shows the deforming edges 23 and 24 shaped in such a manner that the U-shaped clip must be inserted with the right angle edge directed against the forces tending to drive the first pipe member 13 from its inserted position. Thus, demonstrating the importance of setting and holding the deforming edges 23 and 24 of the parallel leg 19 and 20 at right angles to the first pipe member 13.

In FIG. 3a and 3b, the driving forces acting to drive the pipe out are represented by arrows showing the direction of the force and the setting of the deforming edges 23 and 24 against the forces trying to drive the edges 23 and 24 out of engagement with the first pipe member 13.

It should be understood that a force which engages a curved surface against the direction of flow allows for vector forces which tend to cause the deforming edges 23 and 24 and the substantial parallel legs 19 and 20 to begin to spread and eventually cause the failure of the U-shaped clip by driving the clip sufficiently apart to cause the pipe to move backward while under pressure.

It should further be understood that the U-shaped clip member 18 is formed from a spring tempered hardened steel for providing both the hardness necessary to deform the first pipe member 13 and to provide a slight spring like grip once driven into place.

The U-shaped clip 18 also has provided a flat driving surfaces 26 which is only provided over the open portion of the U-shaped clip member 18. The purpose of providing the flat driving surface 26 only over the open part of the inside of the U-shaped clip member 18 is to prevent deformation of one or the other of the parallel legs 19 and 20 and not providing an even driving force across the U-shaped clip when the U-shaped clip member 18 is driven in place. Thus, a tapered edge 27 and 28 is provided on the U-shaped clip 18 which, thus, only leaves or defines the flat driving surface 26 on the U-shaped clip 18.

It should also be understood that in at least one embodiment, the substantially parallel legs 19 and 20 are slightly concaved to form a spring locking effect after they are driven over the apex of the first pipe member 13 and into place.

It should also be understood that the concaved configuration of parallel legs 19 and 20 would provide for a more consistent deformation of the first pipe member 13 rather than cutting the apex more deeply then the portions either before or after the apex of the first pipe member 13. Thus, the concaved configuration of parallel legs 19 and 20 provide a more evenly defined deformation of the surface of the first pipe member 13.

It should be further understood that, in at least some preferred embodiments that the U-shaped clip member 18 will have a curved surface 29 on the inside of the U-shaped clip 18 to follow the contour of the outside surface of the second pipe connector member 10 when the U-shaped clip member 18 is driven against the outside of the second pipe connector member 10.

In at least one embodiment as shown in FIG. 6, a nipple locking means 30 and 31 are provided on the parallel legs 19 and 20 such that as the parallel legs 19 and 20 pass through the slots 11 of the second pipe connector member 10, they deflect the parallel legs 19 and 20 as they pass through the slots and then as the nipple passes the last edge of the second pipe connector member 10 in going into place, the parallel legs 19 and 20 spring the nipples 30 and 31 out and lock the U-shaped clip 18 in place against the second pipe connector member 10 forming a locking effect.

Referring to FIG. 9, wherein the first pipe member 10 is shown after it has been once inserted and locked into place, it can be seen that the surface 32 of the first pipe member 13 has been both cut and deformed or creased by the U-shaped clip 18. It should also be understood that this first pipe member 10 could be reinserted and refastened again, thus, allowing this system to provide a quick connect and disconnect function.

It should be understood from this invention that the wall thickness and outside diameter of the pipe used in the application of this invention will be limited to pipe wall thicknesses in a range from 1 to 20 and from 1 to 50 of the outside diameter of the pipe to its diameter. That in the preferred embodiment, this material will be a millsteel material which is substantially capable of being deformed by the driving of the U-shaped member 18 with a hammer to form the deformation on the first pipe member 13.

It should also be appreciated that the cord length created by the slots 11 and defined by the surface of the substantially parallel leg members 19 and 20, defined to what depth of deformation and creasing will occur on the first pipe member 13 when the U-shaped clip member 18 is driven in place. Thus, as the cord length increases, a deeper creasing occurs in the first pipe member 13 and as the cord length shortens, a lesser cutting or deformation occurs in first pipe member 13. It has been found that a cord length of ¼ to ½ of the outside diameter of the second pipe connector member 10 is the preferred range for providing the maximum holding power without providing excessive deformation to the first pipe member 13. This relationship has been found to be effective when the outside diameter to wall thickness ratio of the first pipe member 13 is in a range of 1 to 20 or 1 to 50.

I claim:

1. A non-threaded pipe connector system for connecting pipe comprising:
   a first pipe member;
   a second pipe connector member having at least two opposed slots each formed tangentially through said second pipe member and having an inside diameter larger than the outside diameter of said first pipe member for receiving and snugly fitting about the outside diameter of said first pipe member;
   at least one o-ring seal means mounted between said first pipe member and said second pipe connector member for forming a seal therebetween and;
   a U-shaped clip means having generally parallel legs for being driven along said slots of said second pipe connector member on the outside of said second pipe connector member and for sharply deforming said first pipe member on at least two sides and for forming an angle with said first pipe member along the sharply deformed area on said first pipe member to prevent said first pipe member from moving after insertion into said second pipe connector member.

2. A non-threaded pipe connector system for connecting pipe of claim 1 further comprising a stopping means for stopping and seating said first pipe member when said member is inserted into said second pipe member after said first pipe member has moved past said two slots in said second pipe connector member.

3. A non-threaded pipe connector system for connecting pipe of claim 2 further comprising a receiving chamber inside said inside diameter of said second pipe connector member formed for receiving said first pipe member and located between the entrance to said second pipe connector member and said stopping means within said second pipe connector member.

4. A non-threaded pipe connector system for connecting pipe of claim 3 wherein said at least one o-ring means is positioned within said receiving chamber.

5. A non-threaded pipe connector system for connecting pipe of claim 4 wherein said parallel legs of said U-shaped clip means further comprise a leading edge means on the tip of the inside edge of said U-shaped clip for gradually creasing the outside diameter of said first pipe member as said U-shaped clip means is driven along said slots of said second pipe connector member.

6. A non-threaded pipe connector system for connecting pipe of claim 5 wherein said parallel legs of said U-shaped clip means further comprise a deforming edge means proximate to said leading edge means and gradually changing from a leading edge means to a deforming edge means in moving from said tip of the inside edge of the U-shaped clip to the inside of the U-shaped clip for deforming said outside diameter of said first pipe member as said U-shaped clip means is driven along said slots of said second pipe connector member.

7. A non-threaded pipe connector system for connecting pipe of claim 6 wherein said deforming edge means is driven into place at substantially right angles to the direction of insertion of said first pipe member for preventing said first pipe member from moving after insertion into said second pipe connector member.

8. A non-threaded pipe connector system for connecting pipe of claim 7 wherein said outside bottom end of said U-shaped clip means forms a flat driving surface means for receiving blows to drive said clip in place and said flat driving surface means only extends over the open part of the inside of the U-shaped part of said U-shaped clip means for providing an even driving force to both legs and for prevention of deformation of one or the other of said legs.

9. A non-threaded pipe connector system for connecting pipe of claim 8 wherein said inside edge of said parallel legs of said U-shaped clip means are concaved sufficiently for forming a spring locking effect after they are driven over the apex of said first pipe member and into place.

10. A non-threaded pipe connector system for connecting pipe of claim 9 wherein said inside edge of said U-shaped clip means is curved to follow the contour of said outside surface of said second pipe member when against said outside surface.

11. A non-threaded pipe connector system for connecting pipe of claim 10 further comprising a nipple locking means on said leading edge of said parallel legs of said U-shaped clip means for engaging said outside diameter surface of said second pipe connector member after passing thereby when said U-shaped clip means is fully driven into place.

12. A non-threaded pipe connector system for connecting pipe of claim 11 wherein said at least two slots formed in said second pipe member have a cord length from ¼ to ½ of the outside diameter of said second pipe connector means.

13. A non-threaded pipe connector system for connecting pipe of claim 12 wherein said first pipe member has a ratio of wall thickness to the outside diameter of said first pipe member of between 1 to 20 and from 1 to 50 for said first pipe member.

14. A non-threaded pipe connector system for connecting pipe of claim 13 wherein said bottom outside end of said U-shaped clip means further comprises a flat surface which is over the open inside portion of the U-shaped clip means and the sides of the bottom outside end of said U-shaped clip means are sloped surfaces over the width of said parallel legs of said U-shaped clip means for providing a means for transmitting even driving pressure along the inside surfaces of said parallel legs of said U-shaped clip means.

* * * * *